United States Patent
Walitzki et al.

(10) Patent No.: US 8,146,369 B2
(45) Date of Patent: Apr. 3, 2012

(54) INTEGRATED DIRECT DRIVE STARTER/GENERATOR FOR TURBINES

(75) Inventors: Hans Juergen Walitzki, Portland, OR (US); Jonathan Sidney Edelson, Portland, OR (US); Rodney Thomas Cox, North Plains, OR (US)

(73) Assignee: Borealis Technical Limited, Gibraltar ( * ) Notice: Subject to any disclaimer, the term of this patent is extended or adjusted under 35 U.S.C. 154(b) by 658 days.

(21) Appl. No.: 12/291,258

(22) Filed: Nov. 6, 2008

(65) Prior Publication Data
US 2009/0126369 A1 May 21, 2009

Related U.S. Application Data
(60) Provisional application No. 61/002,060, filed on Nov. 6, 2007.

(51) Int. Cl.
*F02C 7/26* (2006.01)
(52) U.S. Cl. ............... 60/786; 60/226.1; 290/52
(58) Field of Classification Search .......... 60/226.1, 60/726, 786, 787, 788, 805; 290/36 R, 52, 290/51, 1 A, 1 R, 54, 55; 416/146 R, 229 R, 416/230
See application file for complete search history.

(56) References Cited

U.S. PATENT DOCUMENTS

| | | | | |
|---|---|---|---|---|
| 4,544,115 A * | 10/1985 | Edgley | .................. | 244/54 |
| 4,720,640 A * | 1/1988 | Anderson et al. | .................. | 290/43 |
| 5,015,903 A * | 5/1991 | Hancock et al. | .................. | 310/168 |
| 5,376,827 A * | 12/1994 | Hines | .................. | 290/52 |
| 5,607,329 A * | 3/1997 | Cho et al. | .................. | 440/6 |
| 5,861,696 A * | 1/1999 | Hartman et al. | .................. | 310/156.43 |
| 5,967,749 A | 10/1999 | Eaves et al. | | |
| 6,049,149 A * | 4/2000 | Lin et al. | .................. | 310/68 R |
| 6,152,791 A | 11/2000 | Sinko et al. | | |
| 6,837,757 B2 | 1/2005 | Van Dine et al. | | |
| 6,956,310 B1 | 10/2005 | Knox | | |
| 7,603,864 B2 * | 10/2009 | Gemin et al. | .................. | 60/802 |
| 7,798,778 B2 * | 9/2010 | Martensson | .................. | 416/190 |
| 2004/0123603 A1 * | 7/2004 | Care et al. | .................. | 60/801 |
| 2008/0042507 A1 | 2/2008 | Edelson | | |

OTHER PUBLICATIONS

2003, Bill Van Blarcom, General Dynamics Electric Boat (EB) The Commercial Rim-Driven Permanent Magnet Motor Propulsor Pod, 5 pages.
Lea, et al., Journal of Ship Production, vol. 19, No. 2, May 2003, Scale Model Testing of a Commercial Rim-Driven Propulsor Pod, pp. 121-130.

* cited by examiner

*Primary Examiner* — Louis Casaregola
*Assistant Examiner* — Phutthiwat Wongwian

(57) ABSTRACT

A starter/generator machine for a turbine with a turbine enclosure, an air duct, and a plurality of fan blades is provided. The starter/generator machine includes a plurality of stator elements spaced at intervals in a ring shape adjacent to the air duct and a plurality of rotor elements mounted on the fan blades. The stator elements and the rotor elements are mounted to interact magnetically to exert a force sufficient to move the rotor elements. The stator elements are shaped to minimize air flow interference and are formed with a core, at least one pole, and multiple windings. The spacing between the stator elements and the rotor elements forms an air gap on the order of 5-10 mm, and the number of stator elements is different from the number of rotor elements.

13 Claims, 3 Drawing Sheets

US 8,146,369 B2

INTEGRATED DIRECT DRIVE STARTER/GENERATOR FOR TURBINES

CROSS-REFERENCE TO RELATED APPLICATIONS

This application claims the benefit of provisional Patent Application No. 61/002,060 filed Nov. 6, 2007, which document is included herein by reference.

BACKGROUND OF THE INVENTION

The present invention is concerned with motor-generator systems, and is more especially directed to a gas turbine electric starter.

U.S. patent application Ser. No. 11/974,399, filed Oct. 12, 2007 discloses a rim driven induction motor/generator, for operation with a turbine apparatus, comprising: at least one outer ring stator and at least one inner ring rotor concentric with said ring stator; wherein said turbine apparatus comprises: a turbine having a part fixed to at least one of said rotor or rotors; a central shaft concentric with at least one of said stator or stators; bearing means between said central shaft and said turbine; wherein the tips of said turbine are fixed to an inside surface of said inner ring.

The paper: "Scale Model Testing of a Commercial Rim-Driven Propulsor Pod", by Lea et al, published by SNAME in the "Journal of Ship Production", Volume 19, Number 2, 1 May 2003, pp. 121-130(10), incorporates the following Abstract: Podded propulsion is gaining more widespread use in the marine industry and is prevalent in newer cruise ships in particular. This propulsion system can provide many advantages to the ship owner that include increased propulsion efficiency, arrangement flexibility, payload, and harbor maneuverability. A new, unique podded propulsor concept is being developed that allows optimization of each element of the system. The concept comprises a ducted, multiple-blade row propulsor with a permanent magnet, radial field motor rotor mounted on the tips of the propulsor rotor blades, and the motor stator mounted within the duct of the propulsor. This concept, designated a commercial rim-driven propulsor pod (CRDP), when compared to a conventional hub-driven pod (HDP), offers improved performance in a number of areas, including equal or improved efficiency, cavitation, and hull unsteady pressures. The combination of these CRDP performance parameters allows the ship designer much greater flexibility to provide improved ship performance as compared to that of an HDP. A CRDP is being developed to power a panama-size cruise vessel. The paper addresses the hydrodynamic performance of that CRDP design demonstrated at ¹⁄₂₅th scale as tested at the Hamburg Ship Model Basin, Hamburg Germany (HSVA).

Van Blarcom et al. (2004) describe the design of a rim-driven propulsor. The concept is comprised of a ducted multiple blade row propulsor with a permanent magnet radial flux motor rotor mounted at the tips of the propulsor blades and the motor stator mounted within the duct. The rotor shaft and bearings are housed in a relatively small hub, which is free flooding and supported by a set of downstream stator blades.

U.S. Pat. No. 6,837,757 to Van Dine et al, is directed to a rim-driven propulsion pod arrangement. In the embodiments described in the specification, a rim-driven propulsion pod arrangement has a cylindrical housing with a duct providing a flow path for water and a rotor assembly supported from a central shaft and containing a rotating blade row and driven by a rim drive permanent magnet motor recessed in the housing. An array of vanes downstream from the rotating blade row is arranged to straighten the flow of water emerging from the rotating blade row. Radial bearing members on the rotor have a hardness less than that of the shaft on which the rotor is supported and relatively soft protrusions are provided in the space between the rotor and the housing to limit excursion of the rotor. A thrust bearing has wedges arranged to form a water wedge between facing surfaces of the rotor and the rotor support during rotation of the rotor.

U.S. Pat. No. 6,152,791 to Sinko et al is directed to an external electric drive propulsion module arrangement for swath vessels. In the embodiments described in the specification, a SWATH vessel has a superstructure supported by strut members from a pair of pontoons and each pontoon has a propulsion module removably attached to the rear end of the pontoon. The propulsion module has a self contained propulsion system including a module body with a longitudinal water passage, a rim drive electric motor, a row of rotatable blades, and an inlet opening at the forward end of the cowl member which is arranged to draw in the boundary layer of water flowing along the pontoon to which the propulsion module is attached. Spaced vanes are provided at the inlet opening to block objects from being drawn into the longitudinal passage.

U.S. Pat. No. 5,967,749 to Eaves et al. is directed to a controllable pitch propeller arrangement. In the particular embodiments described in the specification, a controllable pitch propeller arrangement includes a plurality of propeller blades supported from a central hub which is rotatably mounted on a shaft in which each blade is pivotally supported from the central hub. Two radial pins extending from the outer ends of each of the blades are received in corresponding rims having peripherally disposed permanent magnet arrays. The rims are rotated to drive the propeller by energizing the coils in a stator assembly surrounding the rims and the pitch of the blades is changed by changing the phase relationship of the current supplied to the stator coils to change the angular relation of the rims.

U.S. Pat. No. 6,956,310 to Knox is directed to a submersible pump motor having rotor sections spaced apart from each other with bearings located between. The bearings support the shaft of the rotor within a stator. The bearing is stationary and has a cavity in its outer periphery. A metallic coiled member is positioned along the circumference of the bearing, and rests in the cavity on the outside diameter of the bearing. The coiled member engages the bearing and the inner wall of the stator to prevent rotation of the bearing.

BRIEF SUMMARY OF THE INVENTION

A turbine starter/generator machine for a turbine is disclosed, said turbine comprising: at least one fan blade; at least one air duct; said starter/generator machine comprising: at least one rotor having rotor elements; at least one stator having stator elements; wherein said stator elements are mounted on said at least one air duct and said rotor elements are mounted on said at least one fan blade; whereby said stator elements magnetically interact with said rotor elements.

An advantage of the present invention is that it eliminates several gear interfaces, several high-speed bearings, the lubrication and support infrastructure associated with these bearings and gears, and the weight of all of these components. A further advantage of the present invention is that fewer changes are required to retrofit the present invention to existing turbines, compared with the prior art. Furthermore, less mass is rotating at high speed compared with the prior art, which makes the present invention more suited to large jet turbines.

A yet further advantage of the present invention is that hot gases will not be in contact with element of the electric motor and therefore have no impact on its performance and reliability.

A further advantage of the present invention is that very little modification is required to the main components of a turbine and the need for an external, gear or belt driven starter/generator or bleed-air driven starters are eliminated. Furthermore, the amount of electrical power retrievable in generator mode can exceed current traditional systems significantly, allowing even larger loads and higher efficiency operation of an aircraft.

BRIEF DESCRIPTION OF THE SEVERAL VIEWS OF THE DRAWING

For a more complete explanation of the present invention and the technical advantages thereof, reference is now made to the following description and the accompanying drawings in which.

DETAILED DESCRIPTION OF THE INVENTION

Figure 1:
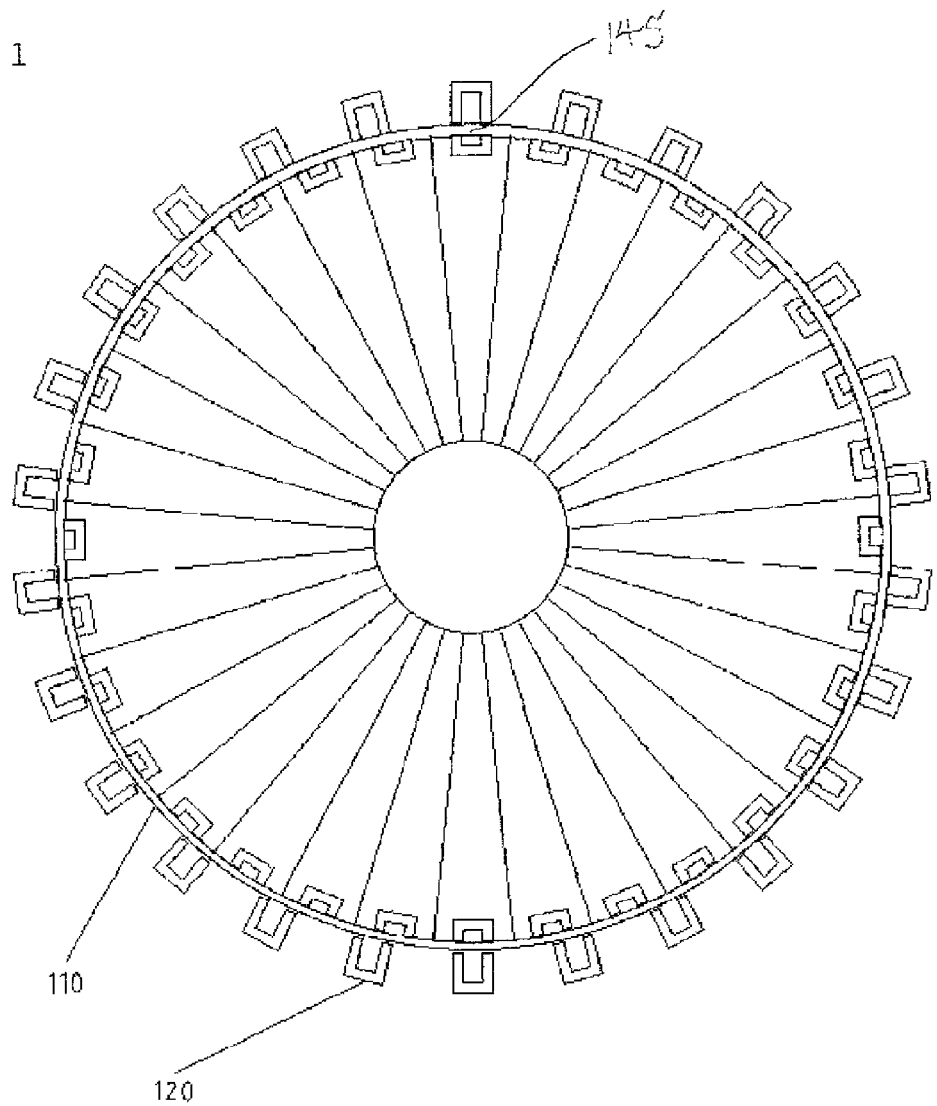
FIG. 1 shows a general design layout.

A turbine starter/generator machine for a turbine, said turbine comprising: at least one fan blade; at least one turbine enclosure; said starter/generator machine comprising: at least one rotor having rotor elements; at least one stator having stator elements; wherein said stator elements are mounted on said at least one air duct and said rotor elements are mounted on said at least one fan blade; whereby said stator elements magnetically interact with said rotor elements.

Preferably the turbine is a gas turbine having several fan blades as known in the art and an air duct as known in the art. Alternatively, other turbines with other arrangements may be used. Said at least one fan blade may be the expansion or compression fan blades of a turbine, or a combination of both.

Preferably, said turbine enclosure is the air duct or fan duct housing the turbine. Alternatively said turbine enclosure may be any housing which encloses the turbine.

The stator is preferably mounted around the outside of the air duct, in a ring shape, adjacent to said air duct and shaped to minimize air flow interference. An advantage of this is that, with the rotor elements in the preferred location of the tips of the fan blades, the stator elements will be closest to the rotor elements thus able to exert the strongest force. Furthermore, this is a convenient location where, in the common turbine design, there is space available. Alternatively, the stator may be mounted in a different position whereby the stator elements and rotor elements can still interact magnetically, that is, the magnetic field from the stator will still exert a force on the rotor sufficient to move the rotor. For example, if space considerations dictate that the rotor elements must be in a position other than the tips of the blades, such as half way along the blades, said stator elements may be in a radially equivalent position, that is, half way along the distance from the hub of the blades to the outside of the air duct. Said stator would have to be designed such that it would not interfere with the operation of the turbine. Alternatively, if this is not possible, stronger stator elements may be used to compensate for the non-optimal rotor element position. Said stator may be aligned with said fan blades or may be at an angle to said fan blades.

The stator is preferably built from individual U-shaped stator elements, each mounted on a circle outside the turbine air duct. An advantage of this is that it is the most lightweight means of constructing an appropriate stator. Alternatively the stator may be constructed with concentric, toroidal, lap, wave, or bobbin windings, or any other windings or may be constructed as any other stator known in the art.

Said stator may be another shape and preferably is shaped to fit closely around the fan duct, where the flux guides will be closest to the magnetic cores of the stator for greatest flux strength, although it may be larger than the circumference of the fan duct, and is more preferably aerodynamically shaped so as not to interfere with air flow.

Preferably, the stator elements are ferro-magnetic C- or U-shaped cores as known in the art although they may be any other shape or material which may be chosen for convenience of construction or efficiency of flux guidance.

Said rotor preferably comprises rotor elements located at the tips of the fan blades. The tips of the fan blades is used in this context to mean the radially exterior edge of the fan blades, that is, the point closest to the exterior of the air duct, the preferred location of the stator elements. An advantage of this location is that this provides the maximum circumference, therefore maximum space for interaction with the maximum number of stator elements, therefore more force can be exerted on the rotor elements, thus the machine will be more efficient. Alternatively, the rotor elements may be located close to the radial edge of the fan blades. This may be necessary if other components are located at the tips. As a further alternative, said rotor elements may be located anywhere on said fan blades where they can interact magnetically with the stator elements.

The rotor elements are preferably ferro-magnetic flux guides thick enough to carry all of the flux. Alternatively, said rotor elements may be any other magnetically conductive rotor elements or other aide to conducting electromagnetic flux.

Said machine is preferably used to start a gas turbine but may be used to start another turbine, and may also or alternatively be used as a generator, to provide electrical power to auxiliary and parasitic loads.

Said machine can be understood as a ring motor mounted externally to the turbine blades, integrated into the periphery of the compressor section of the turbine, preferably being thin enough not to impede airflow substantially, that is, aerodynamically shaped or covered by an aerodynamic shroud. The invention is preferably used to produce the necessary torque to both purge and start the turbine, and may also be used as a generator to provide electrical power to auxiliary and parasitic loads.

Figure 2:
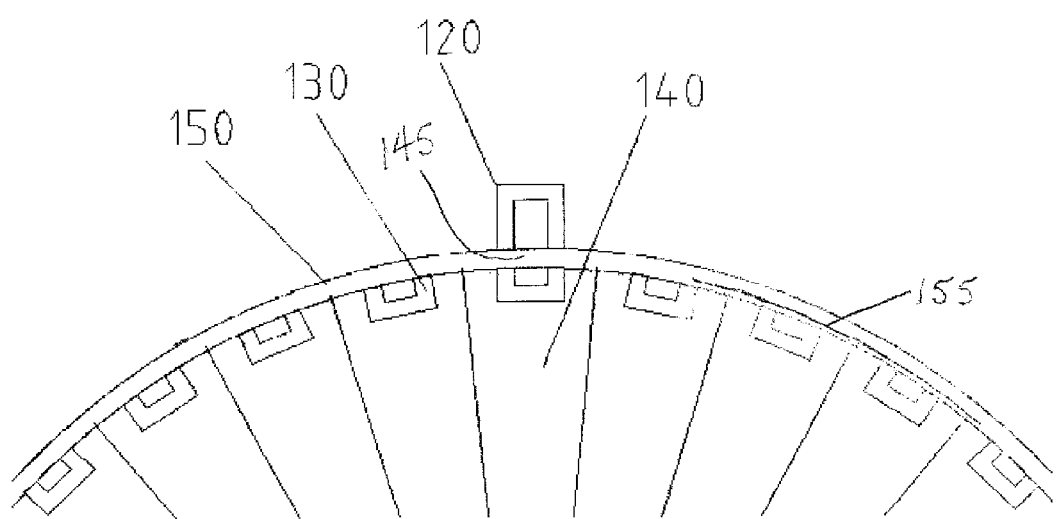
FIG. 2 shows a closeup of a section.
Figure 3:
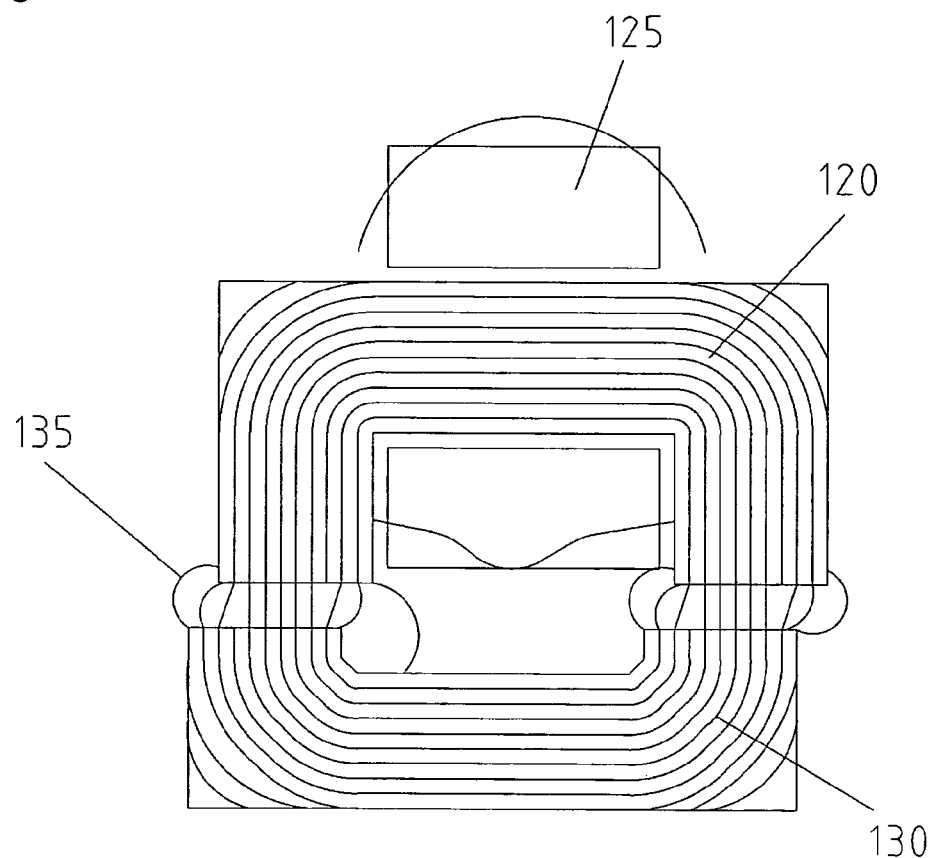
FIG. 3 shows a detail of a single element.

A preferred embodiment of the invention is shown in FIGS. 1, 2 and 3 wherein stator 110 consists of multiple coils 125 wound around stator elements 120 which are mounted in regular intervals and encircle the fan duct 150.

The rotor elements 130 are fixed to the tips of fan blades 140 so that the gap 145 between the rotor elements and the poles of the C-shaped stator elements is of the order of 5-10 mm. An advantage of this is that it is the smallest gap that will allow for thermal expansion and mechanical tolerances at all turbine speeds. Alternatively this gap may be a different size, for example due to design constraints such as the presence of other components on the fan blades. If a smaller range of speeds will be used, it will be possible to reduce this gap which will be preferable due to increased efficiency.

In operation, the reluctance force from the stator onto the rotor elements causes the rotation of the rotor elements and therefore the turbine blades, driving the turbine shaft. A benefit of the ring design is that the entire rotor circumference is involved in mechanical power production, which increases power.

Since current densities are low, the motor is preferably cooled by air-cooling.

Since flux densities are low, preferably, conventional magnetic alloys, or alloys selected for mechanical rather than magnetic properties, are used in the invention. More preferably, conventional M19 steel is used for the stator coil cores, since the magnetic flux densities are limited by the relatively large air-gap 145. Also more preferably, the fan duct is made from aluminum or titanium or a multi-layer composite. An advantage of this is that it will be permeable to the magnetic field.

Preferably, the rotor and stator comprise a motor operating in the same way as any of the motors described in the background section of this patent. Most preferably, the motor is the switched reluctance motor described in the background section of this patent. An advantage of this is that, due to the simplicity of a switched-reluctance motor (that is, having a rotor which is a simple piece of steel with no squirrel cage or windings), it can survive the high number of revolutions per minute necessary for operation within a turbine. Furthermore, it is lighter and has lower rotational inertia than an induction machine rotor. As a yet further advantage, with the switched reluctance machine, there is no need to place conductors, permanent magnets or continuous ferromagnetic material on the turbine; only separate pieces of ferromagnetic or other soft magnetic material are necessary, and are attracted by the reluctance force. This is simpler to construct and interferes less with the turbine operation. As a yet further advantage, since the rotor of a switched reluctance machine can be constructed from pieces of soft magnetic material, it is possible to cast such material into the turbine blades, thus making the rotor integral to the blades, far simplifying design and construction. This is another embodiment of the invention.

Alternatively, the motor may be any appropriately shaped and scaled motor or drive means and may be another form of electric motor including but not limited to a synchronous or asynchronous electric induction motor (which may have at least two phases per pole), or permanent magnet brushless DC motor.

A more detailed account of the operation of one embodiment of the invention will now be given. In this embodiment, the invention consists of a ring motor, in which the ring forms a stator which has salient poles facing towards the fan blades. The rotor element of the switched reluctance motor consists of at least one of the fan blade stages of the turbine wherein flux guides are mounted to the outside tips of at least some of the fan blades, thereby forming the rotor. These flux guides rotate with the compressor fan blades and can either provide torque to the turbine shaft (in starter mode) or generate power (in generator mode) depending on the voltage to said stator coils. When the turbine shaft is spinning and no voltage is applied to the stator coils, the ferro-magnetic flux guides will not impose any drag upon the turbine. Under fast rotation of the turbine shaft, the added stress to the fan blades originating from the additional weight of the ferro-magnetic elements may be compensated for by an additional ring 155 (a 'stress compensation ring'), preferably constructed from steel (non-magnetic) or carbon fiber, at the outer periphery of the turbine fan segment carrying said elements partially shown in FIG. 2.

In an alternate embodiment, the ferro-magnetic elements are mounted to the stress compensation ring in the space between the fan blades.

Electronic means may be used for providing current to stator coils. Said electronic means may be controlled by position sensing means (either any kind of physical sensor, i.e. an optical, magnetic or mechanical) or by a software algorithm that finds the rotor position as a function of the electrical condition of the stator coils, as they are affected by the ferro-magnetic elements passing by. Current may be provided to said stator coils from an external power supply such as an aircraft APU, battery, or other power supply known in the art.

In the generator mode, the coils may be provided with the appropriate control voltages to incur power generation, as it is known in the art of switched reluctance generators. The amount of power generated may be controllable, using a generator control module as known in the art (which may be electronic), over a wide range up to the maximum design limit for the given stator coil configuration, the change in reluctance, and the turbine rotational speed, as known in the art.

FIG. 3 shows a typical C-shaped stator 120 core with its winding 125 and the corresponding flux lines 135 when a rotor element get into full alignment. This is for example only and is not intended to be limiting. The stator core is mounted to the fan duct so that the poles face inward and get as close as possible to the rotor flux guide elements. The winding is composed of multiple conductor turns. Each phase has multiple stator cores with their respective windings, wherein some of these may be connected in a series or parallel to a multi-phase inverter. As the fan blade rotor turns, the ferro-magnetic segments pass the stator coils sequentially.

Figure 4:
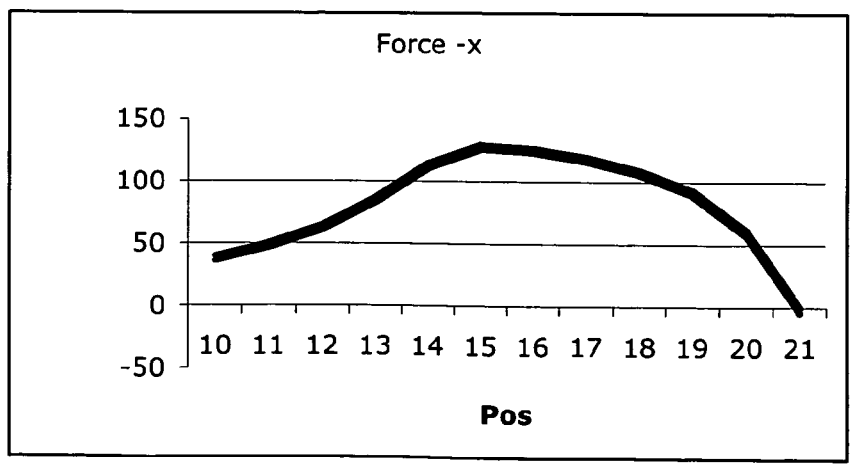
FIG. 4 shows the motive force as function of an element's position.

FIG. 4 shows the reluctance force on a single rotor element passing by said stator coil. In Pos. 10, the rotor element is un-aligned with the stator coil. Consequently, very little reluctance force is produced. As the rotor element moves on in the t-direction, the reluctance force increases to a maximum around position 15. When the rotor element and stator segment are fully aligned in position 21 no force is being produced. If the coil stays magnetized as the rotor segment moves away, a negative (opposing) force would be produced and electrical power can be generated. Therefore, in starter mode, the current to said stator coil will be turned off just before the rotor segment is fully aligned with said stator segment.

After the rotor segment "coasts" past the Phase A stator segment, it moves towards the adjacent Phase B segment, which will now be powered until the rotor moves into full alignment.

This repeats for each phase and each stator segment. For a smooth operation, the stator should have at least two phases with a 180 degree phase shift. The number of stator elements is preferably different than the number of rotor segments to allow engine start from any rest position.

The motor windings may be connected to an inverter drive with a full bridge or with half-bridges connection with the option to recover the energy from the collapsing magnetic field when the current is turned-off.

The motor may comprise a detector for measuring the alignment of the rotor elements with the stator. The detector may be any known form of position detector and may measure the position of the rotor or stator by any means, direct or indirect. The information on the rotor element position may be used by the controller to determine the current flow to each motor phase.

In generator mode, the stator coils are energized by the controller so that the moving rotor elements, varying the inductance of said stator coils, provide a net positive current to the controller which can be used to charge batteries or supply power to on-board utilities.

Example

The following example is for illustration only and is not intended to be limiting. A motor of the present invention will fit over the first compressor fan stage of an RB211 jet turbine with an outer diameter of about 2000 mm. Each rotor element is made from M-19 steel and mounted to each of the 32 turbine fan blades. Each element would weigh less than 2 lbs (0.9 kg). At a current density of 4000 Amp/sq inch of coil cross section, it can provide a torque well in excess of that required for starting this gas turbine. When the turbine is running under its own power, the motor can function as a generator, conservatively providing 400 kW or more depending upon operating speed and control currents. The total active mass of such an electric motor would be less than 100 kg, including approximately 30 kg of mass rotating at turbine speeds. The air-gap of such a motor would be 10 mm, permitting the installation of the stator elements outside the air duct.

The invention claimed is:

1. A starter/generator machine for a turbine with a turbine enclosure, an air duct, and a plurality of fan blades within said air duct, said starter/generator machine comprising a plurality of stator elements spaced at intervals in a ring shape adjacent to said air duct, wherein each of said plurality of stator elements is shaped to minimize air flow interference and is mounted to interact magnetically with each era plurality of rotor elements to exert a force sufficient to move said rotor elements, wherein each of said plurality of rotor elements is mounted on said fan blades inward of a tip of the fan blades in a location selected to interact magnetically with each of said stator elements, wherein each of said plurality of stator elements is formed with a core, at least one pole, and multiple windings and each of said rotor elements is spaced a distance from each of said stator elements to form an air gap on the order of 5-10 mm, and wherein the number of said stator elements is different from the number of said rotor elements.

2. The machine of claim 1, wherein said rotor elements are constructed from a soft magnetic material and said fan blades are formed so that said rotor elements are integral to said fan blades.

3. The machine of claim 1, wherein said stator elements have salient poles facing said fan blades and said rotor elements, thereby forming a ring motor.

4. The machine of claim 1 wherein each of said rotor elements comprises a ferro-magnetic flux guide and each of said stator elements is a ferro-magnetic core that is C-shaped, U-shaped, or bar shaped.

5. The machine of claim 1, wherein each of said rotor elements is mounted on a tip of a fan blade.

6. The machine of claim 1, wherein said rotor elements and said stator elements form a switched reluctance motor, a permanent magnet DC motor, a synchronous induction motor, or an asynchronous induction motor.

7. The machine of claim 6, wherein the motor formed by said stator elements and said rotor elements has at least two phases per pole.

8. The machine of claim 1, wherein said air gap is less than 5 mm.

9. The machine of claim 1, wherein a stress compensation ring is located at an outer periphery of said fan blades.

10. The machine of claim 9 wherein said rotor elements are also mounted to said stress compensation ring.

11. The machine of claim 1, wherein said machine generates power.

12. The machine of claim 11, wherein said machine powers a car, a boat, an aircraft, or other vehicle.

13. The machine of claim 1, wherein said plurality of fan blades are compressor blades or expansion blades.

* * * * *